United States Patent [19]

Saletta et al.

[11] Patent Number: 4,476,511

[45] Date of Patent: Oct. 9, 1984

[54] CIRCUIT INTERRUPTER WITH FRONT PANEL NUMERIC DISPLAY

[75] Inventors: Gary F. Saletta, Irwin; Robert T. Elms; Joseph C. Engel, both of Monroeville, all of Pa.

[73] Assignee: Westinghouse Electric Corp., Pittsburgh, Pa.

[21] Appl. No.: 555,424

[22] Filed: Nov. 23, 1983

Related U.S. Application Data

[63] Continuation of Ser. No. 374,360, May 3, 1982, abandoned, and Ser. No. 140,631, Apr. 15, 1980, abandoned.

[51] Int. Cl.³ ............................................. H07H 3/093
[52] U.S. Cl. ........................................ 361/96; 361/97; 361/67; 361/68; 340/664
[58] Field of Search ..................... 361/96, 97, 93, 94, 361/95, 67, 68, 62, 63, 79, 31; 325/52, 51, 424; 364/480, 481, 482, 483, 492; 340/664

[56] References Cited

U.S. PATENT DOCUMENTS

| | | |
|---|---|---|
| 3,818,275 | 6/1974 | Shimp . |
| 3,842,249 | 10/1974 | Geyer et al. ...................... 364/492 |
| 3,956,670 | 5/1976 | Shimp . |
| 3,964,020 | 6/1976 | Dickerson ..................... 364/483 X |
| 4,077,061 | 2/1978 | Johnston et al. ............... 364/492 X |
| 4,121,269 | 10/1978 | Hobson, Jr. ..................... 361/97 X |
| 4,161,027 | 7/1979 | Russell .............................. 364/492 |
| 4,219,858 | 8/1980 | De Puy et al. ................. 364/483 X |
| 4,245,318 | 1/1981 | Eckart et al. ...................... 364/481 |

FOREIGN PATENT DOCUMENTS 1539385 1/1979 United Kingdom .

OTHER PUBLICATIONS

"Motor Protective Relay IC305 MLTA", Descriptive Bulletin, General Electric, Dec. 1978.
"Micro VersaTrip Programmer" by G. C. Eckart, Industrial Power Systems, Jun. 1979.
"A Microprocessor Oriented Data Acquisition and Control System for Power System Control" by Mulder et al., 3rd Annual Symposium on Computer Architecture, Jan. 1976.
"Results of Field Experiments of Digital Relays Utilizing Mini-Computer and Microprocessor" by Suzuki et al., IFAC Conference on Automatic Control and Protection of Electr. Power Systems, Feb. 1977.
"Operating and Instruction Guide" to the Matco Energy Monitor.
"Digital Processors for Substation Switching and Control" by Horne et al., 1975, pp. 237-243, Conference Developments in Power System Protection, Mar. 11-13, 1975, London, England.
UK Patent Application GB-2,020,124A published Nov. 7, 1979, "Overcurrent Protection" by Matsumoto.
European Patent Application published Nov. 14, 1979, "A New Delayed Action Elctrical Protection by Device, Depending on an Adjusted Magnitude", Rodalfo.
UK Patent Application GB 2,047,995A, "Protective Relay System" by Fujisawa.
IEEE Paper No. 63-919 for Conference, Toronto, Ontario, Canada, published Mar. 6, 1964, "A Method for Calculating Time-Overcurrent Relay Settingsby Digital Computer" by Radke.
IEEE Transactions on Power Apparatus and Systems, vol. PAS-98, No. 3, May-Jun. 1979, "A Digital System for Directional-Comparison Relaxing" by Gallen et al.

*Primary Examiner*—Patrick R. Salce
*Attorney, Agent, or Firm*—M. J. Moran

[57] ABSTRACT

A circuit interrupter includes a trip unit consisting of a microcomputer and a liquid crystal numeric display mounted on the front panel of the trip unit. A power supply provides operating power for the trip unit even after a tripping operation. A microcomputer includes read-only memory for storing instructions to cause the microcomputer to sequentially display numeric values corresponding to the present electrical conditions through the circuit interrupter and the parameters defining the time-trip characteristic of the interrupter. Storage means are provided to store the level of phase or ground current resulting in a tripping operation and for displaying this value following a trip. Means are also provided for displaying a single digit numeric value indicating the cause of trip.

2 Claims, 14 Drawing Figures

CIRCUIT INTERRUPTER WITH FRONT PANEL NUMERIC DISPLAY

This application is a continuation, of application Ser. No. 6/374,360, filed May 3, 1982, now abandoned; and Ser. No. 6/140,631, filed Apr. 15, 1980, also abandoned.

CROSS-REFERENCE TO RELATED APPLICATIONS

The present invention is related to material disclosed in the following copending U.S. patent applications, all of which are assigned to the same assignee of the present application.

Ser. No. 140,559, "Circuit Interrupter With Solid State Digital Trip Unit" filed Apr. 15, 1980 by J. C. Engel;

Ser. No. 140,632, "Circuit Interrupter With Solid State Digital Trip Unit And Positive Power-Up Feature" filed Apr. 15, 1980 by R. T. Elms, G. F. Saletta, and B. J. Mercier;

Ser. No. 140,627, "Circuit Interrupter With Digital Trip Unit And Optical-Coupled Data Input/Output System" filed Apr. 15, 1980 by J. C. Engel, J. A. Wafer, J. T. Wilson, and R. T. Elms, now U.S. Pat. No. 4,338,647;

Ser. No. 140,554, "Circuit Interrupter With Energy Management Functions" filed Apr. 15, 1980 by J. T. Wilson, J. A. Wafer, and J. C. Engel, now U.S. Pat. No. 4,335,437;

Ser. No. 140,628, "Circuit Interrupter With Digital Trip Unit And Style Designator Circuit" filed Apr. 15, 1980 by J. J. Matsko, E. W. Lange, J. C. Engel, and B. J. Mercier, now U.S. Pat. No. 4,331,998;

Ser. No. 140,504, "Circuit Interrupter With Overtemperature Trip Device" filed Apr. 15, 1980 by J. J. Matsko, and J. A. Wafer;

Ser. No. 140,553, "Circuit Interrupter With Digital Trip Unit And Means To Enter Trip Settings" filed Apr. 15, 1980 by R. T. Elms, J. C. Engel, B. J. Mercier, G. F. Saletta, and J. T. Wilson, now U.S. Pat. No. 4,351,013;

Ser. No. 140,626, "Circuit Interrupter With Digital Trip Unit And Power Supply" filed Apr. 15, 1980 by J. C. Engel, J. A. Wafer, R. T. Elms, and G. F. Saletta;

Ser. No. 140,557, "Circuit Interrupter With Multiple Display And Parameter Entry Means" filed Apr. 15, 1980 by J. J. Matsko, J. A. Wafer, J. C. Engel, and B. J. Mercier, now U.S. Pat. No. 4,351,013;

Ser. No. 140,556, "Circuit Interrupter With Remote Indicator And Power Supply" filed Apr. 15, 1980 by J. C. Engel, J. A. Wafer, B. J. Mercier, and J. J. Matsko, now U.S. Pat. No. 4,335,413;

Ser. No. 140,625, "Circuit Interrupter With Digital Trip Unit And Automatic Reset" filed Apr. 15, 1980 by B. J. Mercier and J. C. Engel; and Ser. No. 140,558, "Circuit Interrupter With Digital Trip Unit And Potentiometers For Parameter Entry" filed Apr. 15, 1980 by J. C. Engel, B. J. Mercier, and R. T. Elms, now U.S. Pat. No. 4,331,997.

BACKGROUND OF THE INVENTION

1. Field of the Invention

The invention relates to circuit interrupters having means for electronically analyzing the electrical conditions on the circuit being protected, and means for automtically opening to interrupt the current flow whenever electrical conditions exceed predetermined limits.

2. Description of the Prior Art

Circuit breakers are widely used in industrial and commercial applications for protecting electrical conductors and apparatus connected thereto from damage due to excessive current flow. Circuit breakers were initially designed to interrupt when the current flowing through them exceeded a certain level. Gradually, however, more elaborate time-current interrupting characteristics were required such that a circuit breaker would rapidly open upon very high overload conditions but would delay interruption upon detection of lower overload currents, the delay time being roughly inversely proportional to the degree of overload. Additionally, circuit breakers were called upon to interrupt upon the detection of ground fault currents. As the complexity of electrical distribution systems increased, the control portions of circuit breakers on a system were interconnected to provide selectivity and coordination of interruption sequences. This allowed the system designer to specify the order in which the various circuit breakers would interrupt under specified fault conditions.

During the late 1960's, solid-state electronic control circuits were developed for use in high power, low voltage circuit breakers. These control circuits performed functions such as instantaneous and delayed tripping which were traditionally achieved by magnetic and thermal means. The improved accuracy and flexibility of the solid state electronic controls resulted in their wide-spread acceptance, even though the electronic control circuits were often more expensive than their mechanical counterparts.

The earliest electronic control circuit designs utilized discrete components such as transistors, resistors, and capacitors. More recent designs have included integrated circuits which have provided improved product performance at reduced cost.

As the cost of energy continues its rapid rise, there is increasing interest in more effectively controlling the usage of electrical energy through the design of more sophisticated electrical distribution systems. Therefore, there is required a circuit breaker providing a more complex analysis of electrical conditions on the circuit being protected and even greater capability for coordination with other breakers. As always, it is extremely desirable to provide this capability at the same or lower cost.

SUMMARY OF THE INVENTION

Circuit interrupter apparatus is provided for use on an electrical power distribution system. The apparatus includes interrupter means for conducting current flow through an associated electrical circuit and for operating to interrupt current flow therethrough upon command, sensing and powering means disposed in appropriate relationship to the interrupter means for sensing current flow therethrough and for supplying operating power to the apparatus, means for storing a plurality of values defining the desired time-current trip characteristic of the apparatus, electronic means for comparing the output of the sensing and powering means to the values corresponding to the desired time-current tripping characteristics of the apparatus for operating the interrupter means when current flow through the breaker exceeds the desired time-current trip characteristic. The electronic means also analyzes electrical parameters on the associated circuit. Numeric display means visible from the exterior of the apparatus are provided for displaying a substantially instantaneous real-time numerical representation of the electrical parameters.

Figure 1:
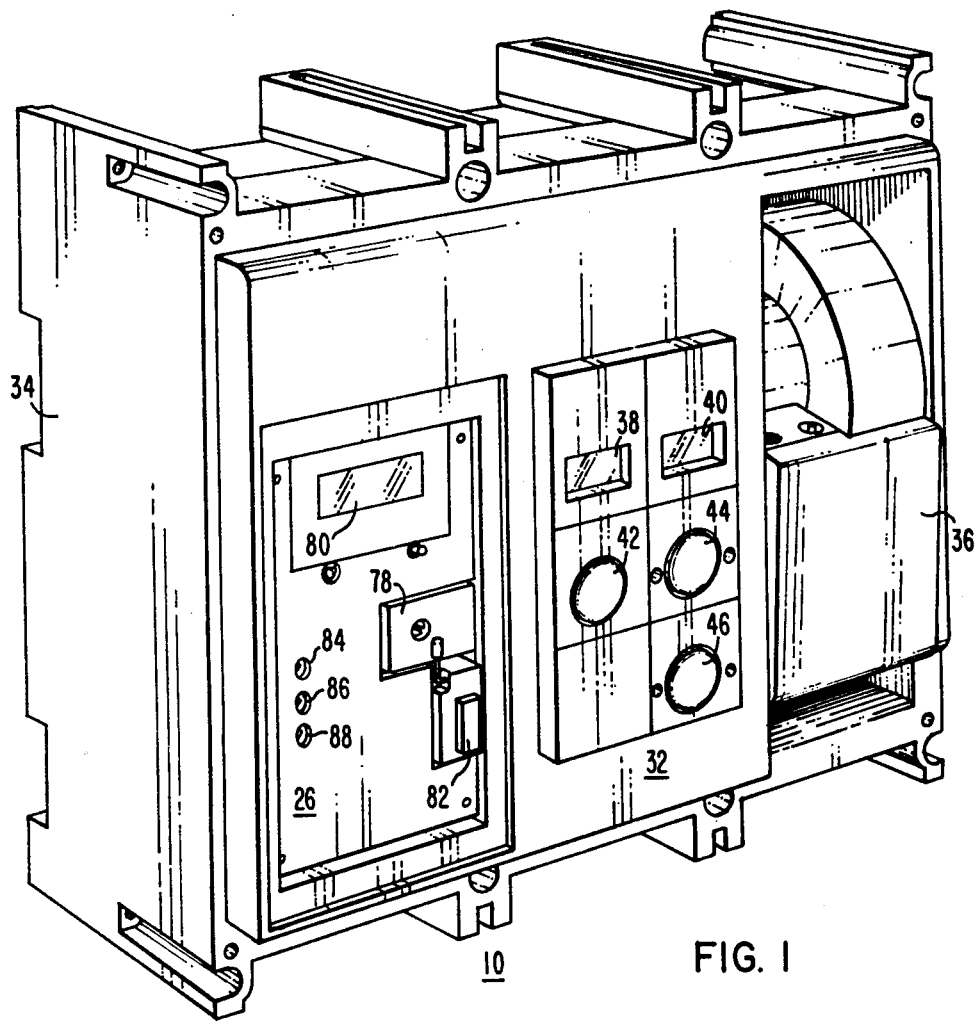
FIG. 1 is a perspective view of a circuit breaker embodying the principles of the present invention.

DESCRIPTION OF THE PREFERRED EMBODIMENT General Physical and Electrical Description:

Reference may now be had to the drawings, in which like reference characters refer to corresponding components. A perspective view and a functional block diagram of a molded case circuit breaker 10 employing the principles of the present invention are provided in FIGS. 1 and 2, respectively. Although the circuit interrupter 10 is a three-pole circuit breaker for use on a three-phase electrical circuit, the invention is, of course, not so limited and could be used on a single-phase circuit or another type of multiphase circuit.

A power source such as a transformer or switchboard bus is connected to input terminals 12 and an electrical load is connected to output terminals 14. Internal conductors 16 connected to the terminals 12 and 14 are also connected to interrupting contacts 18 which serve to selectively open and close an electrical circuit through the circuit breaker. The contacts 18 are operated by a mechanism 20 which responds to manually or automatically-initiated commands to open or close the contacts 18.

Current transformers 24 surround each of the internal phase conductors 16 to sense the level of current flow through the conductors 16. The output from the current transformers 24 is supplied to a trip unit 26, along with the output from a current transformer 28 which senses the level of ground fault current flowing in the circuit. The trip unit 26 constantly monitors the level of phase and ground fault currents flowing in the circuit to which the breaker 10 is connected and initiates a command signal to a trip coil 22 which actuates the mechanism 20 to open the contacts 18 whenever electrical conditions on the circuit being protected exceed predetermined limits stored in the trip unit 26. During normal conditions, the mechanism 20 can be commanded to open and close the contacts 18 through manually-initiated commands applied through the manual controls 32.

Figure 2:
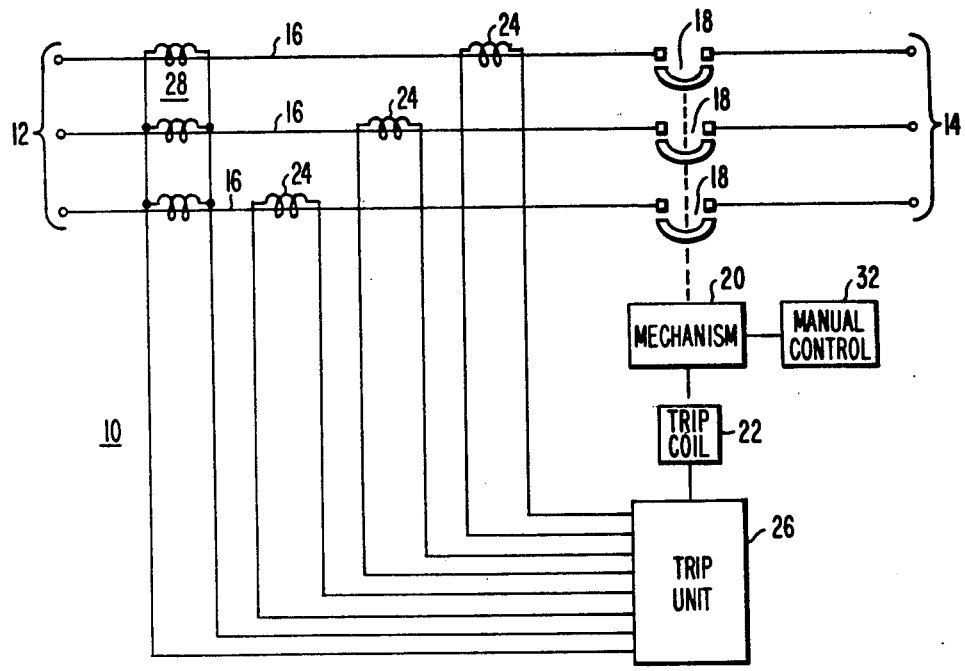
FIG. 2 is a functional block diagram of the circuit breaker shown in FIG. 1.

Referring to FIG. 1, it can be seen that the circuit breaker 10 includes a molded insulating housing 34. The terminals 12 and 14 are on the rear of the housing 34 and are thus not shown in FIG. 1. A handle 36 is mounted on the right-hand side of the housing 34 to allow an operator to manually charge a spring (not shown) in the mechanism 20. The manual controls 32 are positioned in the center of the housing 34. Windows 38 and 40 indicate the state of charge of the spring and the position of the contacts 18, respectively. A push-button 42 allows an operator to cause an internal electric motor to mechanically charge the spring in the same manner as the manual charging operation which can be performed by the handle 36. A pushbutton 44 allows an operator to cause the spring to operate the mechanism 20 to close the contacts 18. Similarly, a pushbutton 46 allows an operator to cause the spring and mechanism 20 to open the contacts 18.

The panel of the trip unit 26 is positioned on the left side of the housing 34 as can be seen in FIG. 1. This panel includes a numeric display device 80 to permit an operator to observe the electrical parameters on the circuit being protected, a plurality of light-emitting diode (LED) indicators 84, 86, and 88, a rating plug 78 to determine the maximum continuous current of the breaker, and a plug-in programmable read-only memory (PROM) chip 82 to define the time-current trip characteristic of the breaker.

Use of a Circuit Breaker in an Electrical Power Distribution System

Figure 3:
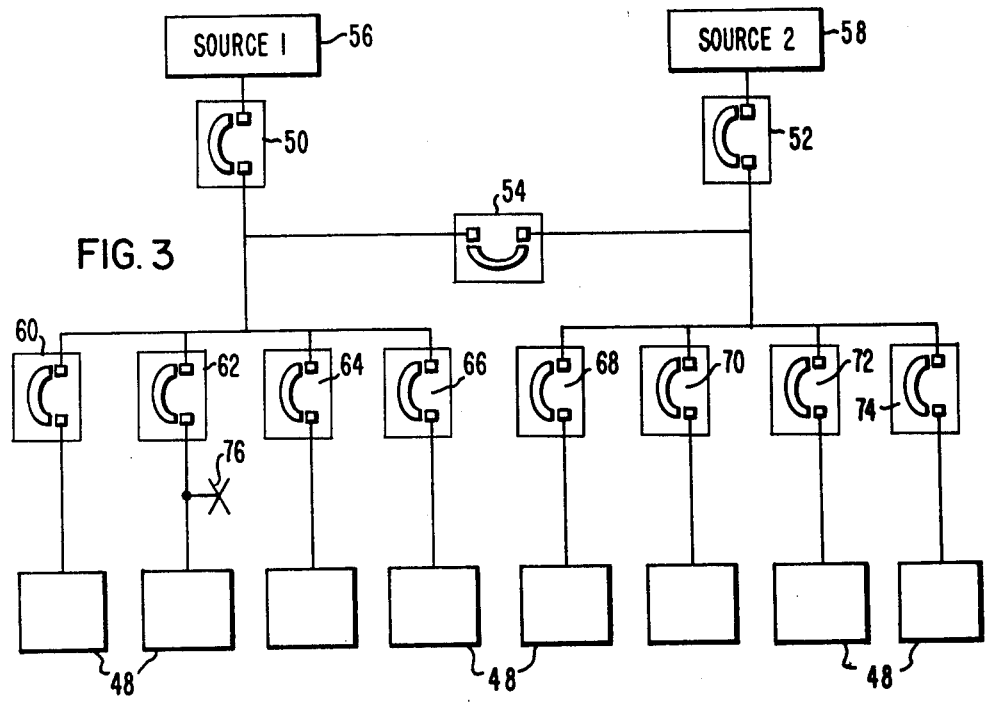
FIG. 3 is an electrical schematic diagram of a distribution system employing the circuit breaker of FIGS. 'and 2.

Before explaining the operation of the trip unit, it will be helpful to describe in greater detail the function of a circuit breaker in an electrical power distribution circuit. FIG. 3 shows a typical electrical distribution system. A plurality of electrical loads 48 are supplied through circuit breakers 50, 52 and 54 from either of two sources of electrical energy 56 and 58. The sources 56 and 58 could be transformers connected to separate high voltage electrical feeder lines, dieselpowered generators, or a combination of the two. Power from the first source 56 is supplied through the first main circuit breaker 50 to a plurality of branch circuit breakers 60, 62, 64, and 66. Similarly, power from the second source 58 may be supplied through the second main circuit breaker 52 to a second plurality of branch circuit breakers 68, 70, 72, and 74. Alternatively, power from either source 56 or 58 may be supplied through the tie circuit breaker 54 to the branch circuit breakers on the opposite side. Generally, the main and tie circuit breakers 50, 52 and 54 are coordinated so that no branch circuit is simultaneously supplied by both sources. The capacity of the main and tie circuit breakers 50, 52 and 54 is usually greater than that of any branch circuit breaker.

If a fault (abnormally large current flow) should occur at, for example, the point 76, it is desirable that this condition be detected by the branch circuit breaker 62 and that this breaker rapidly trip, or open, to isolate the fault from any source of electrical power. The fault at the point 76 may be a large over-current condition caused, for example, by a short circuit between two of the phase conductors of the circuit, or an overload only slightly above the rating of the breaker such as might be caused by an overloaded motor. Alternatively, it may be a ground fault caused by a breakdown of insulation on one of the conductors, allowing a relatively small amount of current flow to an object at ground potential. In any case, the fault would also be detected by the main or tie breakers 50, 52 or 54 through which the load fed by branch breaker 62 is supplied at the time of the fault. However, it is desirable that only the branch circuit breaker 62 operate to isolate the fault from the source of electrical power. The reason for this is that if the main or tie circuit breaker should trip, electrical power would be lost to a greater portion of the entire system than merely the load attached to the branch circuit on which the fault occurred. It is therefore desirable that the main and tie circuit breakers 50, 52 and 54 should have a longer delay period following detection of a fault before they initiate a tripping operation. The coordination of delay times among the main, tie, and branch circuit breakers for various types of faults and the need for interlocking between breakers are major reasons for the need to provide sophisticated control in a trip unit.

Time-Circuit Tripping Characteristics:

In order to achieve the coordination between circuit breakers as described above, the time vs. current tripping characteristics of each circuit breaker must be specified. Circuit breakers have traditionally exhibited characteristics similar to that shown in FIG. 4, where both axes are plotted on a logarithmic scale. When current below the maximum continuous current rating of the breaker is flowing, the breaker will, of course, remain closed. As current increases, however, it is desirable that at some point, for example the point 300 of FIG. 4, the breaker should trip if this overload current persists for an extended period of time. Should a current flow equal to the maximum continuous current rating as specified by point 300 persist, it can be seen from FIG. 4 that the breaker will trip in approximately 60 seconds. At slightly higher values of current, the time required for the breaker to trip will be shorter. For example at 1.6 times maximum continuous current as specified by point 302, the breaker will trip in about 20 seconds. The portion of the curve between the points 300 and 304 is known as the long delay, or thermal, characteristic of the breaker, since this characteristic was provided by a bimetal element in traditional breakers. It is desirable that both the current level at which the long delay portion begins and the trip time required for any point on that portion be adjustable. These parameters are known as long delay pick-up and long delay time, respectively, the variation of which is indicated by the arrows 306 and 308.

At very high overcurrent levels, for example 12 times the maximum continuous current and above, it is desirable that the circuit breaker trip as rapidly as possible. This point 312 on the curve is known as the "instantaneous" or magnetic, trip level, since traditional breakers employed an electromagnet in series with the contacts to provide the most rapid response. The instantaneous pick-up level is usually adjustable, as indicated by the arrow 314.

To aid in coordinating breakers within a distribution system, modern circuit breakers have added a short delay trip characteristic 316 between the long delay and instantaneous portions. The present invention allows adjustment of both the short delay pick-up level and the short delay trip time as indicated by the arrows 318 and 320.

Figure 4:
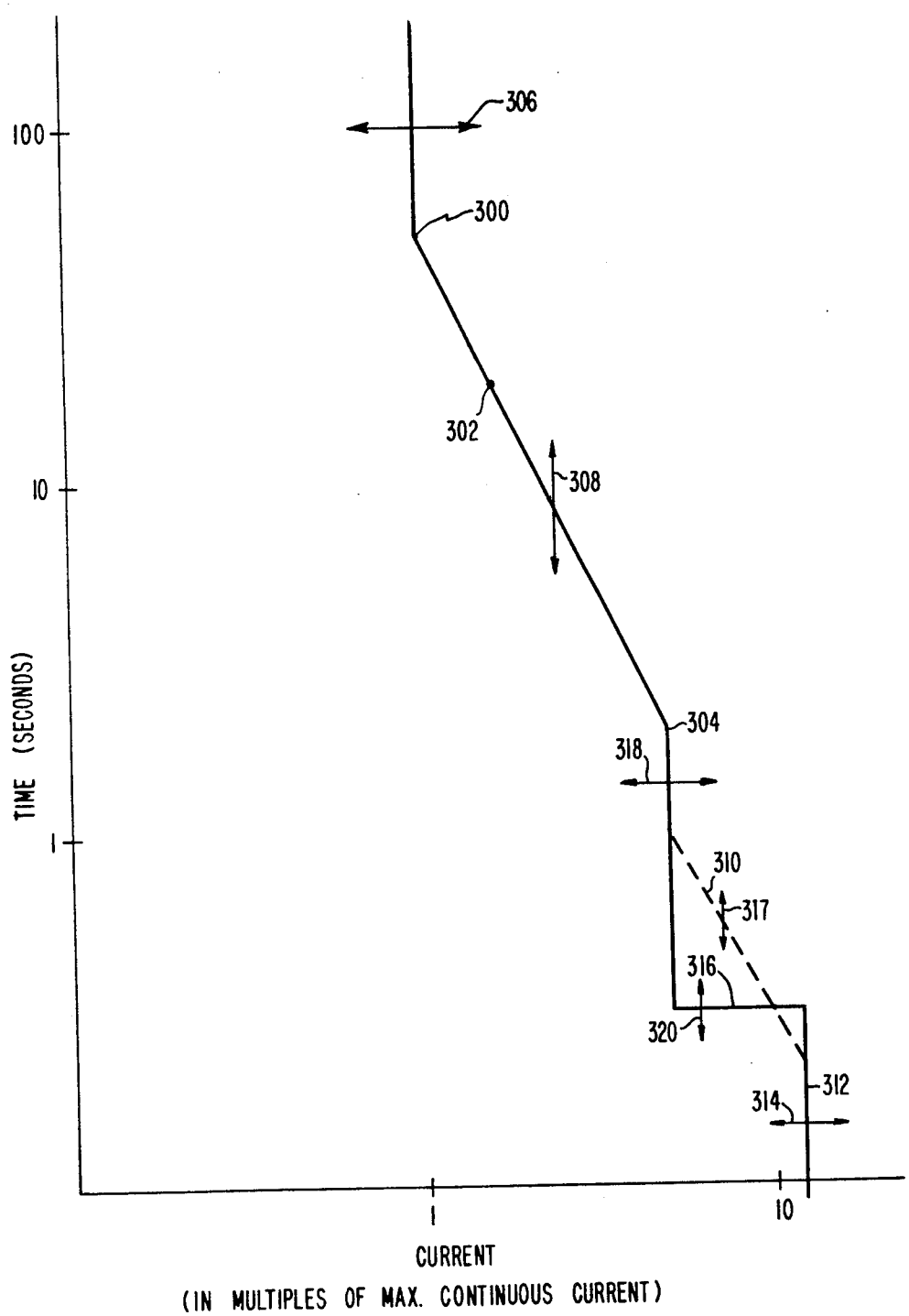
FIG. 4 is a graph of a typical time-current tripping characteristic, plotted on a log-log scale.

Under certain conditions it is desirable that the trip time over the short delay portion vary inversely with the square of the current. This is known as an $I^2t$ characteristic and is indicated in FIG. 4 by the broken line 310.

Trip Unit Functions and Modes:

The functions and modes of the trip unit 26 employing the principles of the present invention will now be described. A rating plug 78 is inserted into the front panel of the trip unit 26 to specify the maximum continuous current to be allowed in the circuit being protected by the circuit breaker. This may be less than the actual capacity of the circuit breaker, which is known as the frame size. For example, the frame size for the circuit breaker may be 1,600 amperes; however, when the breaker is initially installed the conductors of the circuit being protected may be sized so as to continuously supply only 1,200 amperes of electrical current. Therefore, a rating plug can be inserted in the trip unit to ensure that the maximum continuous current allowed by the circuit breaker will be only 1,200 amperes even though the circuit breaker itself is capable of safely carrying 1,600 amperes continuously.

Throughout the remainder of the description of the invention, current levels may be described as multiples of the maximum continuous current as specified by the rating plug. This convention will be expressed as, for example, 3 per unit or 3 p.u. to indicate a current level of three times the maximum continuous current.

As can be seen in FIG. 1, the trip unit panel contains a numeric display indicator 80 and a number of LED indicators 84, 86, and 88. The electronic circuitry internal to the trip unit causes the numeric display indicator 80 to sequentially display the present value of electrical conditions on the circuit being protected and the various limit settings defining the time-current trip curve of the breaker as currently set. The LED's 84, 86 and 88 indicate whether a ground fault, long delay overcurrent, or "instantaneous" overcurrent was the cause of a trip operation.

To the right and below the numeric display indicator 80 and rating plug 78 is a plug-in programmable read-only memory (PROM) module 82, such as a type 3601 manufactured by the Intel Corporation, in which are stored the various limit values and settings which specify the time-current tripping characteristic of this particular circuit breaker. The method of loading the settings into this module and the manner in which the module is used by the trip unit circuitry will be described in a later section.

System Description

Figure 5:
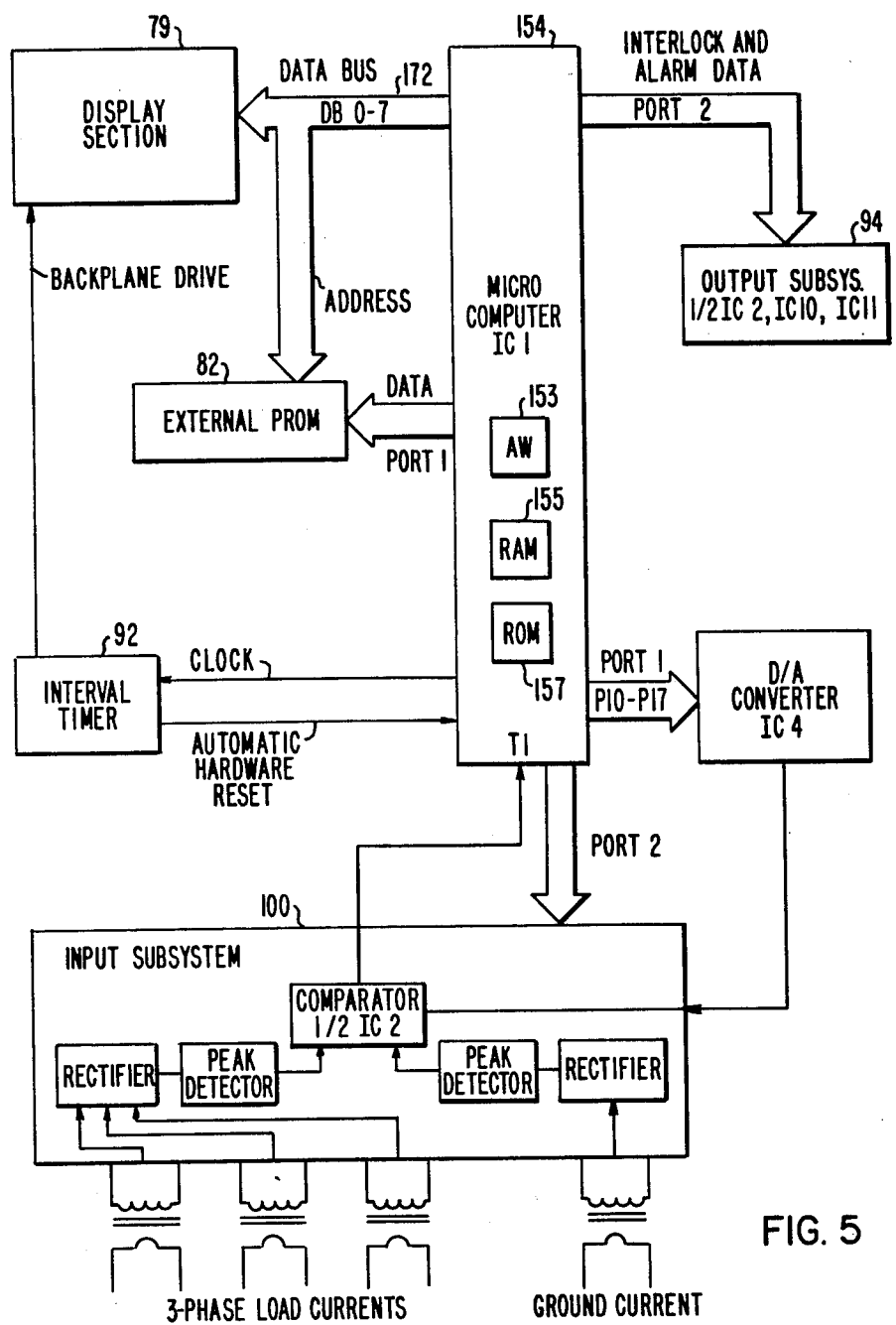
FIG. 5 is a block diagram of the trip unit shown in FIGS. 1 and 2.

The trip unit circuitry includes a digital arithmetic logic and control processor 154 such as the type 8048 microcomputer manufactured by the Intel Corporation, and is presented by block diagram in FIG. 5. This section will describe each block of FIG. 5 and present a description of the operation of the trip unit.

The microcomputer 154 contains an arithmetic logic unit (ALU) 153, $64 \times 8$-bit bytes of read-write random access memory (RAM) 155, $1K \times 8$-bit bytes of read-only memory (ROM) 157, an 8-line data bus 172, and two 8-line input-output ports Port 1 and Port 2. Other types of digital arithmetic logic and control processors could be used, such as those requiring outboard memory circuits rather than having the on-chip RAM and ROM circuits of the 8048. However, for a detailed description of the microcomputer, reference should be made to the MCS-48 Microcomputer User's Manual published by the Intel Corporation.

Figure 6A:
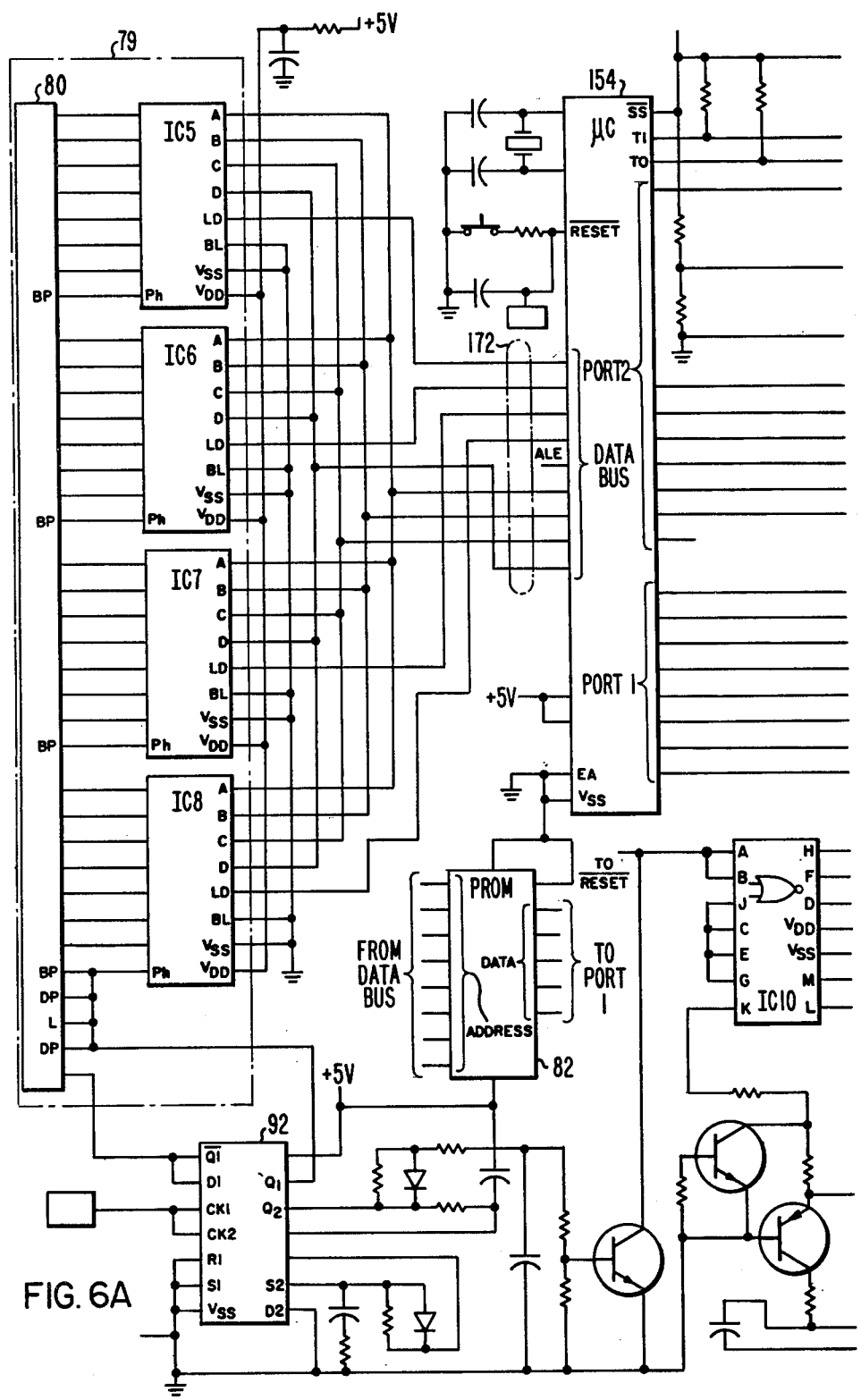
FIGS. 6A and 6B are partial schematic diagrams of the trip unit circuitry of FIG. 5.
Figure 6B:
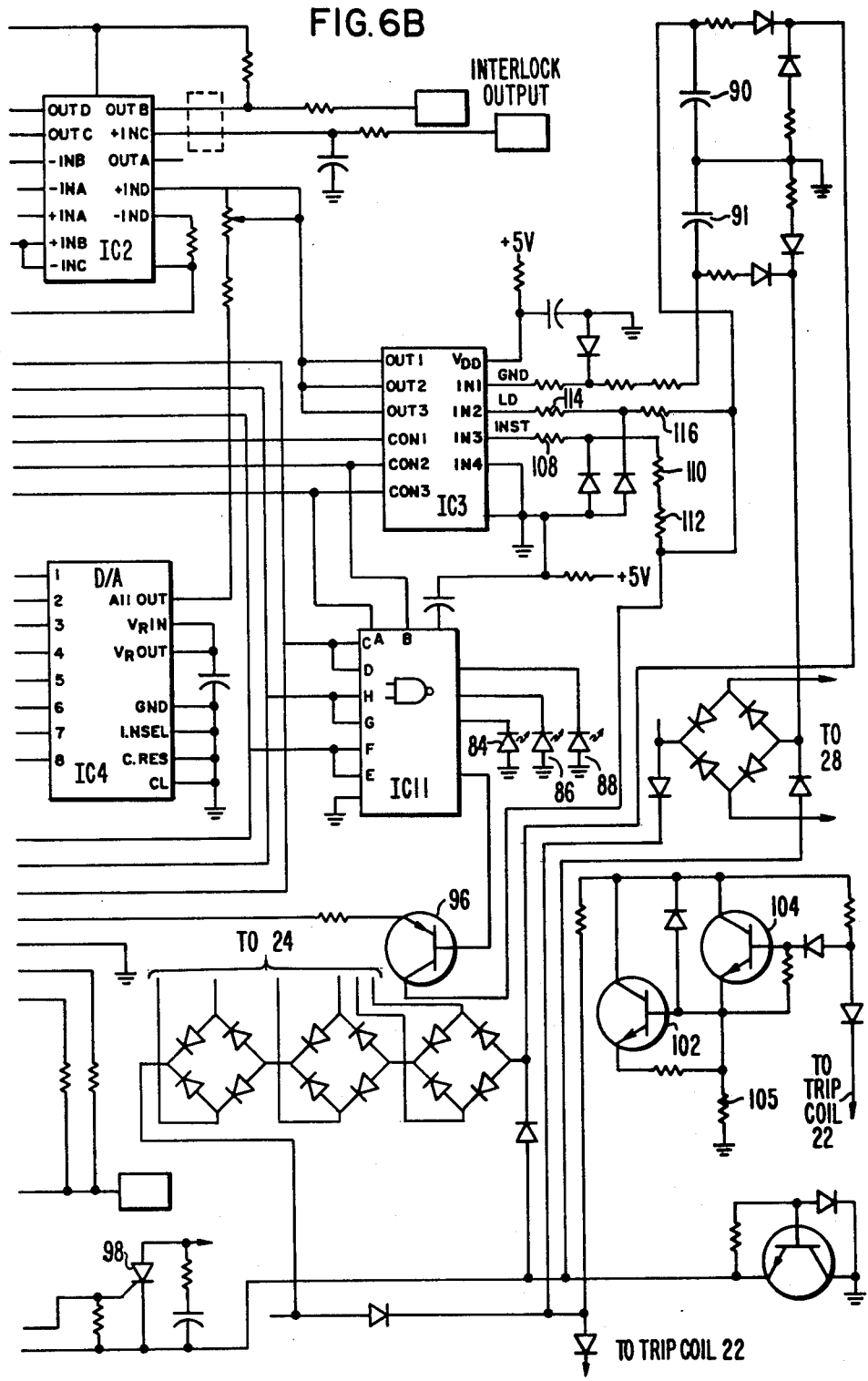

Circuit Description:

Referring to the system block diagram of FIG. 5 and the detailed schematic diagrams of FIGS. 6A and 6B, the display section 79 is first described. It consists of four data latches IC5, IC6, IC7 and IC8 and the four-digit liquid crystal numeric display 80. The data latches may be the type MC 14543. Display data is multiplexed on the data bus 172 of the microcomputer; the four least significant bits represent data and the four most significant bits its position on the display. The liquid crystal display 80 derives its back plane clock from the interval timer 92. This interval timer also fulfills the function of resetting the microcomputer if it does not receive its clock signals from the microcomputer 154. Under norman operation, the microprocessor outputs a pulse on every execution of the main program loop.

It can be seen on the diagram of FIG. 5, that the PROM 82 receives its address from the data bus 172 and outputs its contents via Port 1. Since the display section 79 and the address lines of the PROM 82 are both connected to the data bus 172, the address information for the PROM would tend to cause a garbled display. However, the address information appears on the bus for only a small fraction of a second, to be immediately followed by valid display information. The LCD display therefore does not have time to respond to the PROM address information and the operator observes only the valid display information.

The output subsystem 94 consists of ½ of a type A775 comparator IC2, and of quad NOR gate IC10 and quad NAND gate IC11. Through comparator IC2 the microcomputer 154 via Port 2 sets an interlock output signal after a ground fault pickup. Through the NAND gate of IC11 the microcomputer sets the corresponding LED indicator 84, 86 or 88 after a trip.

The NOR gates IC10 provide the high-level output signal to trip a single SCR 98 under ground, short delay, long delay, or instantaneous trip. It also forces this trip signal to follow the RESET signal during power-up thus eliminating false tripping during the 10 ms period of microcomputer instability after power is first applied.

The input subsystem 100 consists of two peak detecting circuits including capacitors 90 and 91, a type ZN425J D/A converter IC4, the other half of comparator IC2, and the analog switches of IC3. The capacitors 90 and 91 store the peak value of phase and ground current, respectively, for each cycle of the AC line. The peak values are then read every cycle by the microcomputer. The capacitors 90 and 91 are reset (discharged) later in each cycle by the microcomputer through a transistor 96 and IC11 activated by Port 2.

Figure 8:
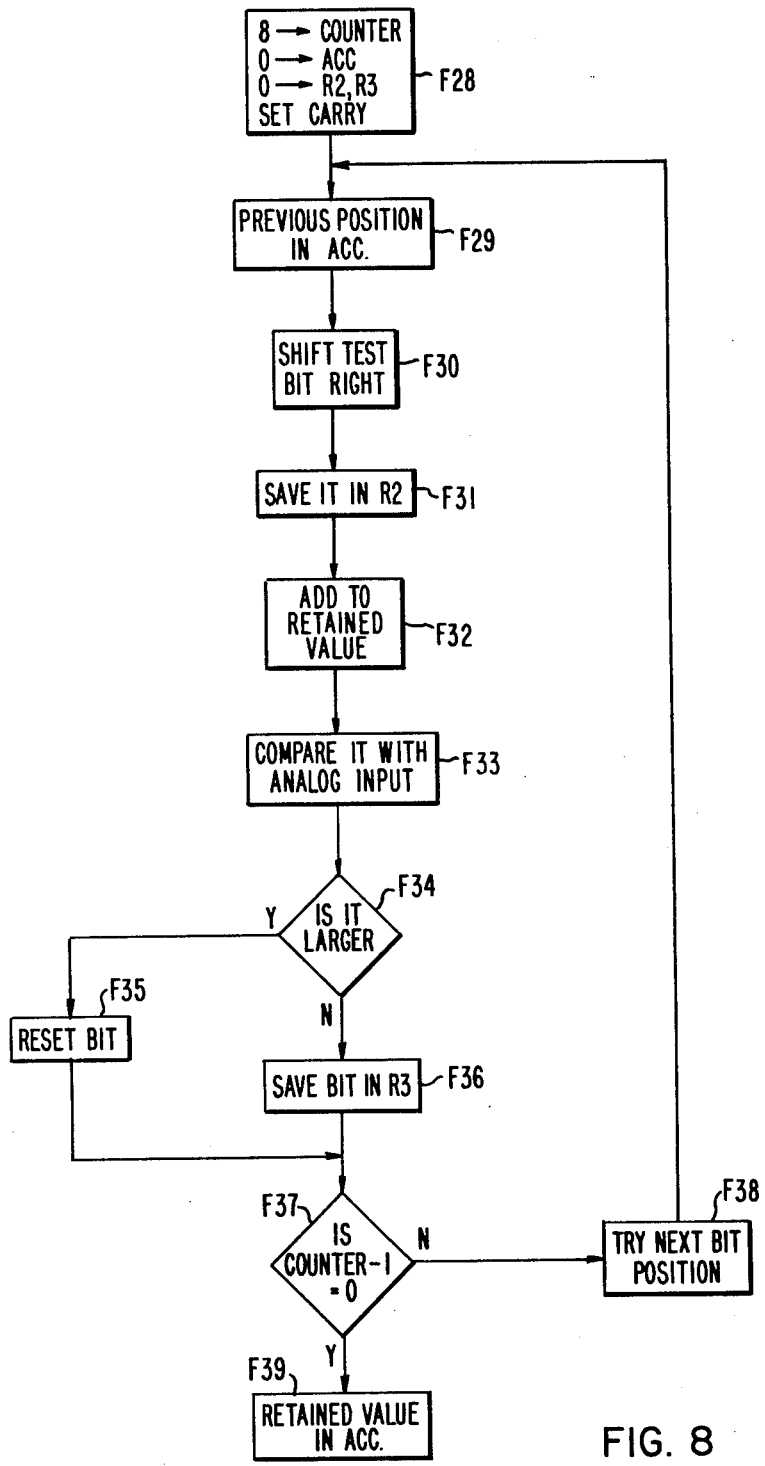
FIG. 8 is a flow chart of the analog-to-digital routine stored in the memory of a microcomputer which is a component of the trip unit.

The analog-to-digital conversion of the signal from the input subsystem 100 is accomplished by an iteration technique employing the D/A converter IC4 and comparator IC2. A digital value is supplied to the D/A converter IC4 by the microcomputer 154. This value is converted to an analog value and supplied to IC2. IC2 then compares this value to the value supplied from capacitors 90 or 91 through the analog switch IC3 and indicates whether or not the value supplied by IC4 is larger. The result of this comparison is supplied via the T1 test input to the microcomputer 154, which then generates a new value to IC4. This process continues until the value generated by the microcomputer 154 is very close to that supplied by the analog switch IC3, and the result is retained in the accumulator of microcomputer 154. The technique is shown in greater detail in the flow chart of FIG. 8.

The function of transistors 102 and 104 and their associated components is to direct the phase (or ground) currents from the CT's 24 and 28 to the rating plug resistor 105 during non-tripping operation. However, when a trip condition is sensed and the trip SCR 98 is turned on, transistors 102 and 104 are turned off, thereby directing essentially all of the phase (or ground) current signal into the shunt trip coil for a positive tripping action.

Power for the trip unit circuitry is supplied by rechargeable battery with charging power produced by the current transformers 24. Alternately, power could be derived directly from the current transformers 24 or independently via connections to the conductors 16.

Description of Operation

The operation of the invention is described in detail in this section. In the first part, a general flow chart of the program and the allocation of memory are presented. Major subroutines called from the main loop will then be described in the second part.

Data Memory Allocation:

The allocation of the internal RAM 155 of the microcomputer 154 is shown in Table I.

TABLE I

| DATA MEMORY MAP (RAM) | |
| --- | --- |
| 63 | Long Delay Pick-up (LDP) |
| 62 | Long Delay Time (LDT) |
| 61 | Short Delay Pick-up (SDP) |
| 60 | Short Time (SDT) |
| 59 | Instantaneous Trip Setting (ITS) |
| 58 | Ground Fault Pick-up (GFP) |
| 57 | Ground Fault Time (GFT) |
| 56 | |
| 55 | |
| 54 | Sum 6 = Tally of GFT |
| 53 | Sum 4 = Tally of SDT |
| 52 | Sum 45 = Self-checking Sum 4 |
| 51 | Sum 65 = Self-checking Sum 45 |
| 50 | |
| 49 | |
| 48 | |
| 47 | |
| 46 | Sum 3 = Lower Tally of LDT |
| 45 | Sum 2 = Middle Tally of LDT |
| 44 | Sum 1 = Upper Tally of LDT |
| 43 | |
| 42 | |
| 41 | Trip Flag |
| 40 | Cycle Counter |
| 39 | Present value of inst. current |
| 38 | Present value of GND current |
| 37 | |
| 36 | Trip value |
| 35 | |
| 34 | Display index |
| 33 | Low byte of addr. of next display |
| 32 | High byte of addr. of next display |

As can be seen, the top eight locations are used to load the limit value settings, such as Long Delay Pick-Up and Long Delay Time. The values in these locations are refreshed every 4 seconds, after a reading of the external PROM 82. The tallies of ground fault, short delay, and long delay timing functions are also kept in RAM. The address of the next information to be displayed, the present value of ground and instantaneous current, and the trip value are stored in locations shown. The addressing of those values is done indirectly through Register ∅ (R∅) or Register 1 (R1) which contains the particular address.

The lower 32 words of data memory are used for standard "housekeeping" functions of the microcomputer, as explained in the previously referenced Intel User's Manual.

Main Loop

Figure 7:
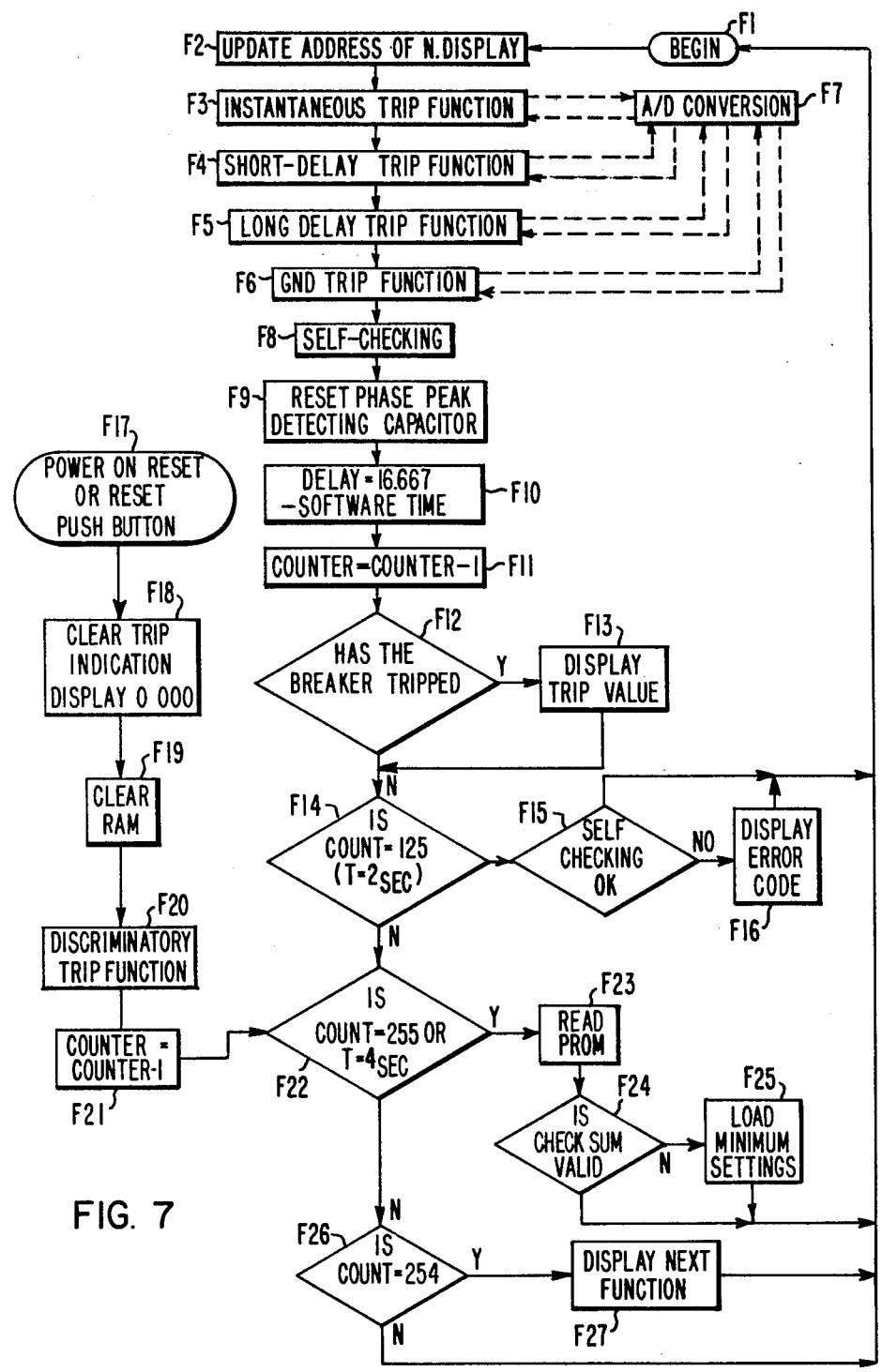
FIG. 7 is a general flow chart of the program stored in the memory of the microcomputer.

Refer to the flow chart of the main loop shown in FIG. 7. After the system is powered-up or the reset button on the front panel is pushed, the program counter of the microcomputer 154 is loaded automatically with ∅∅∅ hex. An instruction at this location brings the microcomputer to three initialization routines: clear RAM, load display with ∅∅∅.∅, and perform discriminatary trip function. In the latter function, the present value of the phase current is compared with 9.0 p.u., i.e. nine times rated current. Thus, if the breaker is experiencing a high overload when the trip unit is first powered-up, the program is able to trip the breaker with 0.5 ms. These initialization routines are executed only during power-up or reset.

At this point the program counter is decremented to FF hex or 255 decimal. This count signals the microcomputer 154 to read the external PROM 82. If the PROM 82 is unreadable (contents=∅∅H or FFH) or the checksum is invalid, minimum limit value settings (from ROM 157 internal to the microcomputer) are loaded in corresponding RAM locations. Otherwise, the last sixteen memory locations of the PROM 82 are read. The use of a 2K PROM will thus allow the user to reprogram a new set of limit values into the PROM 16 times, before a new PROM must be employed. (16×16 values×8 bits per value=2048). After reading values from PROM, the program jumps to entry location BEGIN. From then on, this will be the starting point of the main loop.

The internal ROM 157 of the microcomputer 154 includes a look-up table containing the addresses of the subroutines which prepare the formats to enable the various parameter values to be displayed. Through an index R34 (initialized at ∅ and updated by each display routine) the address of the next display routine is read and stored in R33 and R32 of RAM 155.

Next, the four main functions of the program are entered: the instantaneous trip function, the short delay trip function, the long delay trip function and the ground trip function. Those functions will be presented in detail in the next section.

A self-checking subroutine is next executed. In this subroutine, the analog-to-digital converter, short delay pick-up, and ground test functions are checked. If a failure is detected, a failure flag is set and an error code stored in RAM 155.

The capacitors 90 and 91 for storing peak phase and ground current are then discharged and a time delay executed equal to 16.667 ms less the time expended in executing the main loop instructions.

A flag is next checked to determine if a tripping operation has occurred. If so, the value of phase or ground current which caused the trip is now displayed. Since the trip unit is powered externally, a tripping operation will not inhibit execution of the microcomputer software.

After the first cycle, the main counter is at 254D. This number signals the microcomputer 154 to select another parameter to be displayed by the indicator 80. Realizing that this count is circular, it can be seen that the selection is done immediately after reading the PROM 82 and 255×16.667 ms (4.27 sec) thereafter.

The parameter display is a three-digit number in per unit format, the parameter being displayed is identified by a numeric code which appears concurrently with the parameter value in the left-most digit of the numeric display 80, as follows:

1. Present Phase Current
2. Long Delay Pick Up
3. Long Delay Time
4. Short Delay Pick Up
5. Short Delay Time
6. Ground Fault Pick Up
7. Ground Fault Time
8. Instantaneous Trip Level
9. Present Ground Current When the counter reaches 125 (2.1 sec) and if an error was found in the self-checking routine, an error code will be displayed in the indicator 80 instead of a parameter value: 1 for A/D conversion failure or instantaneous trip function failure, 2 for short delay function failure, 3 for ground trip function failure, and 4 to indicate that minimum settings are being used. This will cause the indicator 80 to change from parameter value to error code every two seconds, indicating to the user that an error was found.

Detailed Description of Operation:

This section will describe, in detail, the function blocks shown in the general flow diagram. Reference should be made to the flow diagrams presented for each block.

Figure 9:
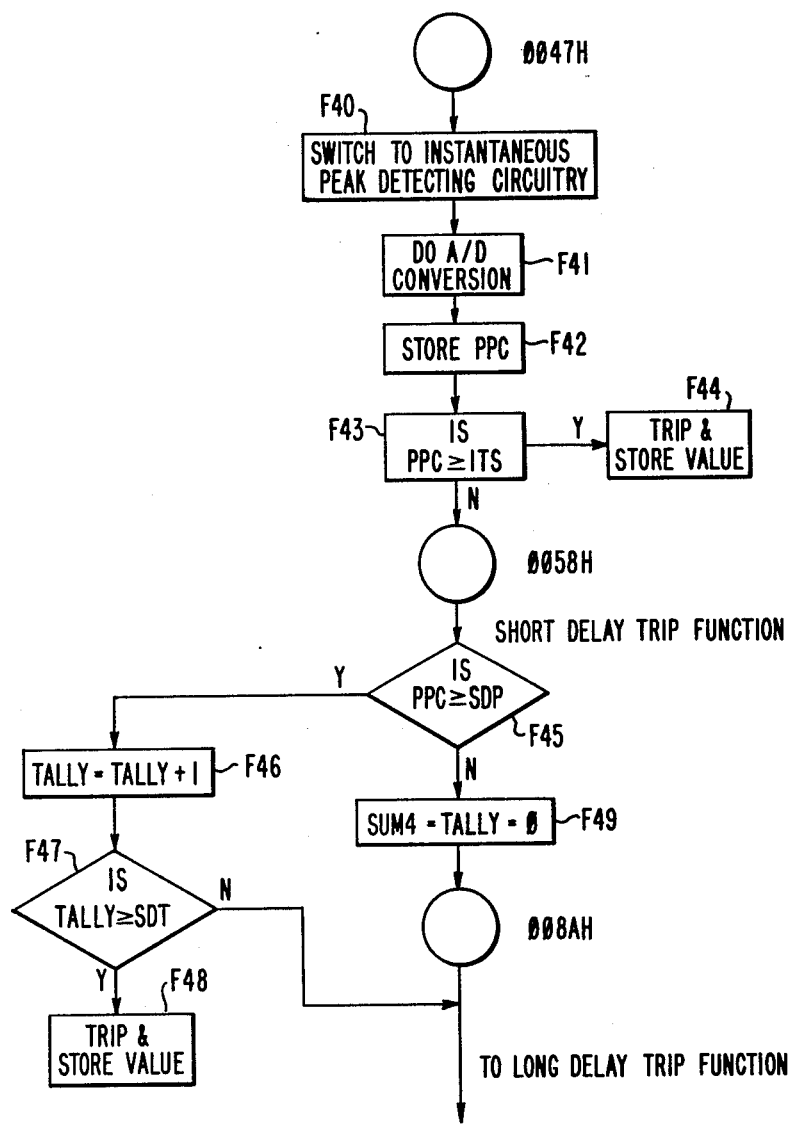
FIG. 9 is a flow chart of the short delay trip and instantaneous trip functions of the program of FIG. 7.

Considering the instantaneous trip function and short delay trip function first, refer to the flow chart of FIG. 9. Upon entering those two routines, the microcomputer 154 switches the D/A converter IC4 analog output to the phase peak detecting circuitry through resistors 108, 110 and 112, having values of 6.8K, 220K, and 220K, respectively. This produces a scale factor of 1 p.u. (with a digital representation of 160). The A/D conversion (FIG. 8) subroutine is now called which lasts 0.26 ms (104 instructions×2.5 $\mu$cs average execution time).

The A/D conversion subroutine operates by clearing the accumulator, then setting the most significant bit thereof as a test value. This value is sent to the D/A converter which produces a corresponding analog value. This analog value is compared to the phase current value provided by the peak detecting capacitor 90. If the trial analog value is smaller than the phase current, then the trial value consisting of one bit is added to the digital successive approximation of the phase current value which is retained in register R3. The test bit in the accumulator is then shifted one place to the right, a corresponding analog test value generated, a comparison made, and the bit is retained or not in register R3 according to the results of the comparison. In a similar manner all eight bits of the accumulator are tested and at the completion of the eighth bit, the retained value in R3 is transferred to the accumulator.

The digital value of present phase current (PPC) is then stored in RAM 155 in order to be displayed and used in the Short Delay routine. If PPC is greater than the instantaneous trip setting (ITS), a tripping operation is executed, which includes the function of saving the current value which caused the trip (to be displayed on indicator 80) and lighting the proper LED 84, 86 or 88 to indicate cause-of-trip. Otherwise, the short delay trip function is entered.

Figure 10:
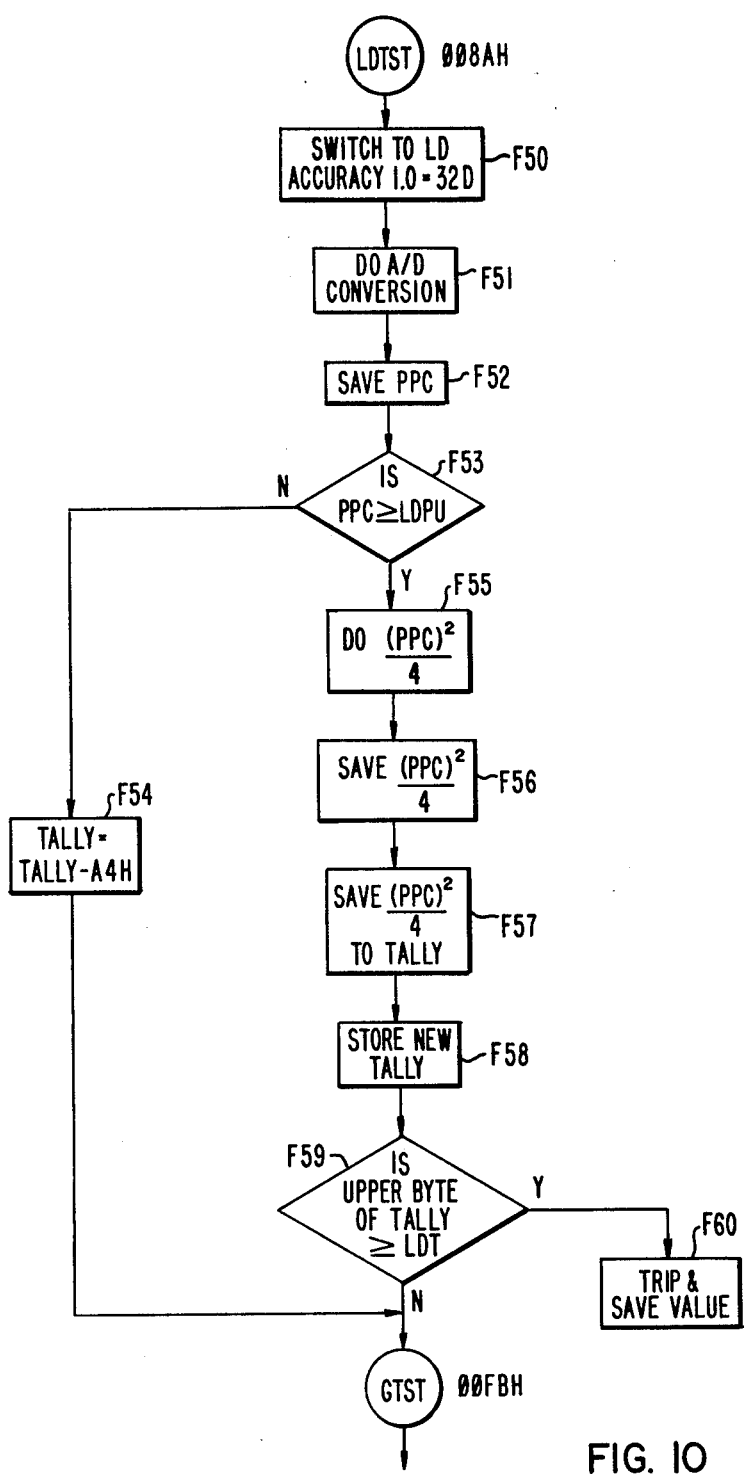
FIG. 10 is a flow chart of the long delay trip function of the program of FIG. 7.

In the Short Delay routine, a tally is incremented every cycle if the PPC is larger than the short delay pickup. The tally is then compared to a value corresponding to the short delay time setting (SDT). If the tally is greater than the SDT value, a trip operation is called for. Otherwise, the Long Delay Test routine is entered. If the PPC is smaller than the short delay pickup the short delay tally is reset to zero. At this point the Long Delay Test (LDTST), as shown in FIG. 10, is entered.

Upon entry, the LDTST function switches (through IC3) to the phase peak detecting circuitry. However, this is done through resistors 114 and 116 having values of 3.3K and 220K, respectively (see FIG. 6). Thus, the threshold level in the A/D conversion process is doubled. Keeping in mind that 1 p.u. was encoded as 16D in the instantaneous trip and short delay functions, it can be seen that now 1 p.u. is encoded as 32D (a resolution of 3.12%).

For long delay timing a quantity proportional to $(i)^2$ must be calculated. This value is added to an accumulating register and then compared to the Long Delay Time (LDT) setting whenever the Long Delay Pick-up (LDPU) setting is exceeded. The accumulating register then represents "$(i)^2 t$". The use of an example will illustrate the procedure used:
Suppose
$$LDPU = 1 \; PU = 32 \; d$$

$$LDT = 2 \text{ sec}$$

$$I(PPC) = 6 \; PU = 32 \; D \times 6 = 192 \; D$$

$$i^2 = (192)^2 = 36,864$$

Instead of storing $i^2$, however, the quantity $i^2/4$ is retained since less memory space is required, and sufficient resolution still maintained. Thus:
$$i^2/4 = 36,864/4 = 9216.$$

If $i^2/4$ is accumulated into a tally of 24 bits every 1/60 of a second, in two seconds the tally will be:

$$9216 \times 60 \times 2 = 1,105,920 \; D$$

which brings the upper eight bits of the tally to the value:

$$\frac{1,105,920}{2^{16}} = 17D$$

Thus, an LDT setting for 2 seconds, encoded as 17 D or 11 H, is reached in exactly 2 seconds as desired. Therefore, LDT setting = # of seconds × 17/2. It must be realized that with lower PPC the trip unit will take longer time to reach that count, and with larger PPC the trip unit will reach that count faster (time will be inversely related to $(i)^2$).

Referring to the flow chart of FIG. 10, it can be seen that when the PPC is less than LDPU the tally is decremented with a fixed value of A4 H = 164 D. This number represents the (LDP min)2/4 or (0.8 × 32 D)2/4 = 164 D.

Figure 11:
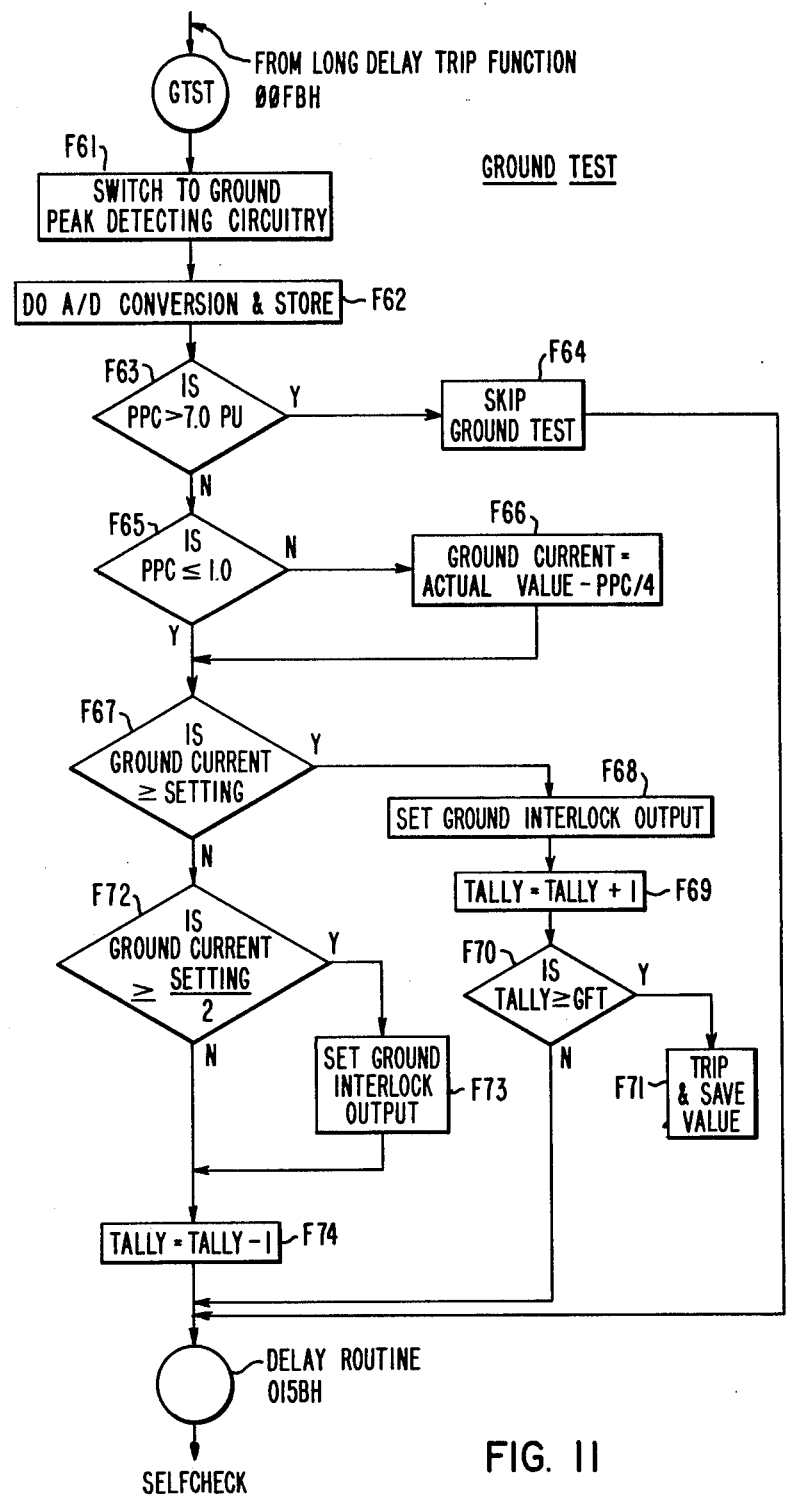
FIG. 11 is a flow chart of the ground trip function of the program of FIG. 7.

The ground fault test function is now performed. In prior art trip units, on non-ground faults in which the phase current is between three and ten times the breaker frame rating, the ground fault pick-up is desensitized so that the fictitious ground fault current (an artifact of the current transformers) will not cause an improper trip. In the present trip unit as can be seen in the flow chart of FIG. 11, further corrective action is provided. The ground fault pick-up is desensitized, as in the prior art, when PPC is greater than or equal to 7.0 PU; however, for PPC between 1.0 and 7.0 PU, the fictitious ground current is accounted for by subtracting from the ground current sensed, the PPC divided by 4. This method could, of course, be accomplished by other means, such as analog circuitry.

If the present ground current is greater than the ground current pick-up setting, the ground interlock output is set, to signal other breakers that this breaker is monitoring of a ground fault. Next a tally similar to the short delay tally is incremented. If this tally is now greater than the ground fault tally trip value, a trip operation is performed. Otherwise, the program enters the self-checking routine.

If the present ground current is less than the ground current pick-up setting, but greater than ½ the setting, the ground interlock output is set. In addition, for all values of ground current less than the setting, the tally is decremented (not reset as in Short Delay) and the self-checking routine is entered.

Figure 12:
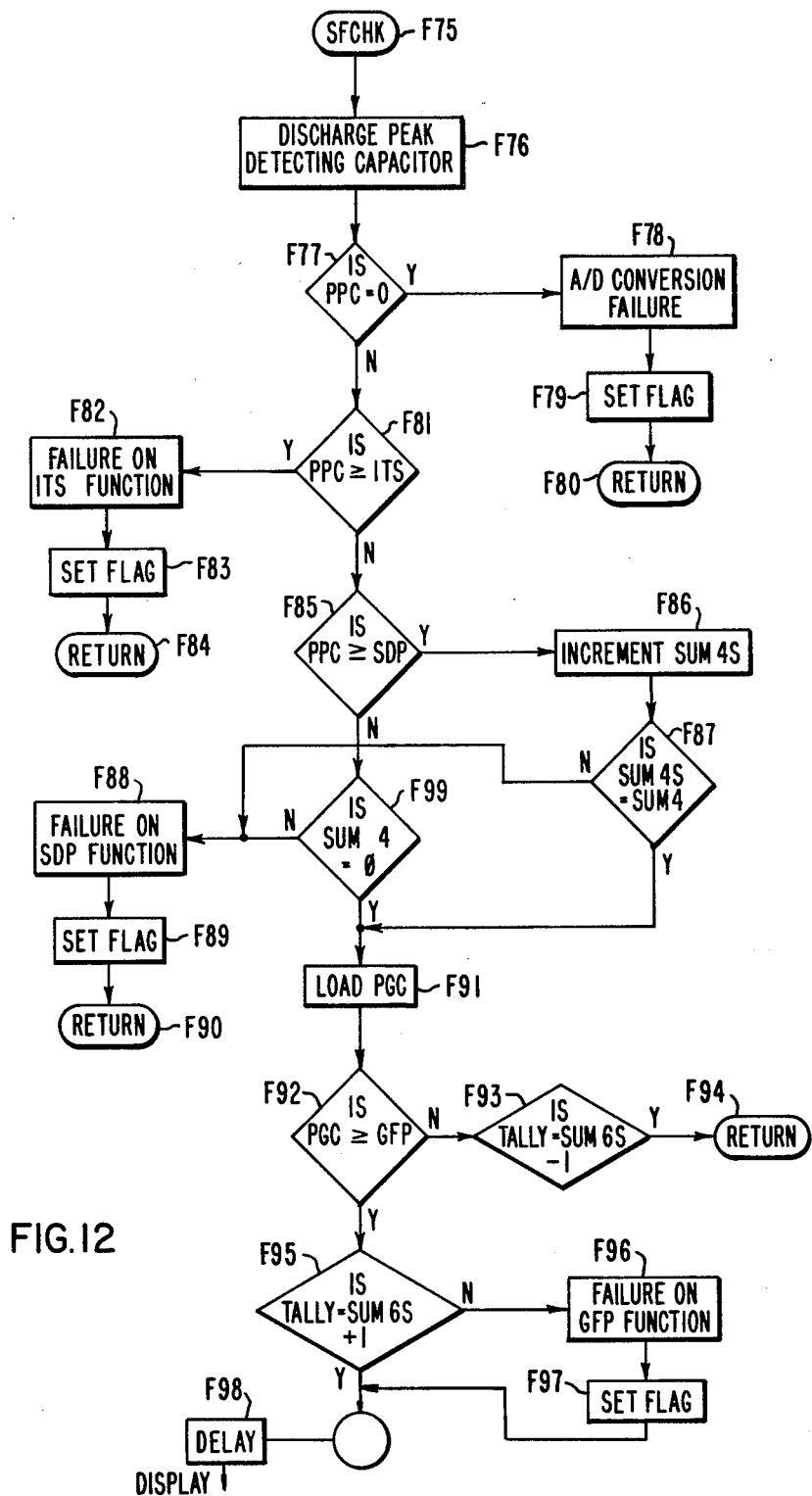
FIG. 12 is a flow chart of the self-checking routine of the program of FIG. 7.

Refer to the self-checking routine in FIG. 12. This routine, performed every cycle, resets the peakdetecting capacitors 90 and 91 and checks the running tally of ground fault and short delay functions, alerting the user to a malfunction of the main loop. This is done by setting flags which are checked every 2.1 seconds in the main loop, and storing an error code. If the flag is set, the main loop causes an error code number to appear on the numeric display 80. Thus, instead of a four-second display of parameter values, there would be alternate 2.1 second displays of error codes and parameter values.

Figure 13:
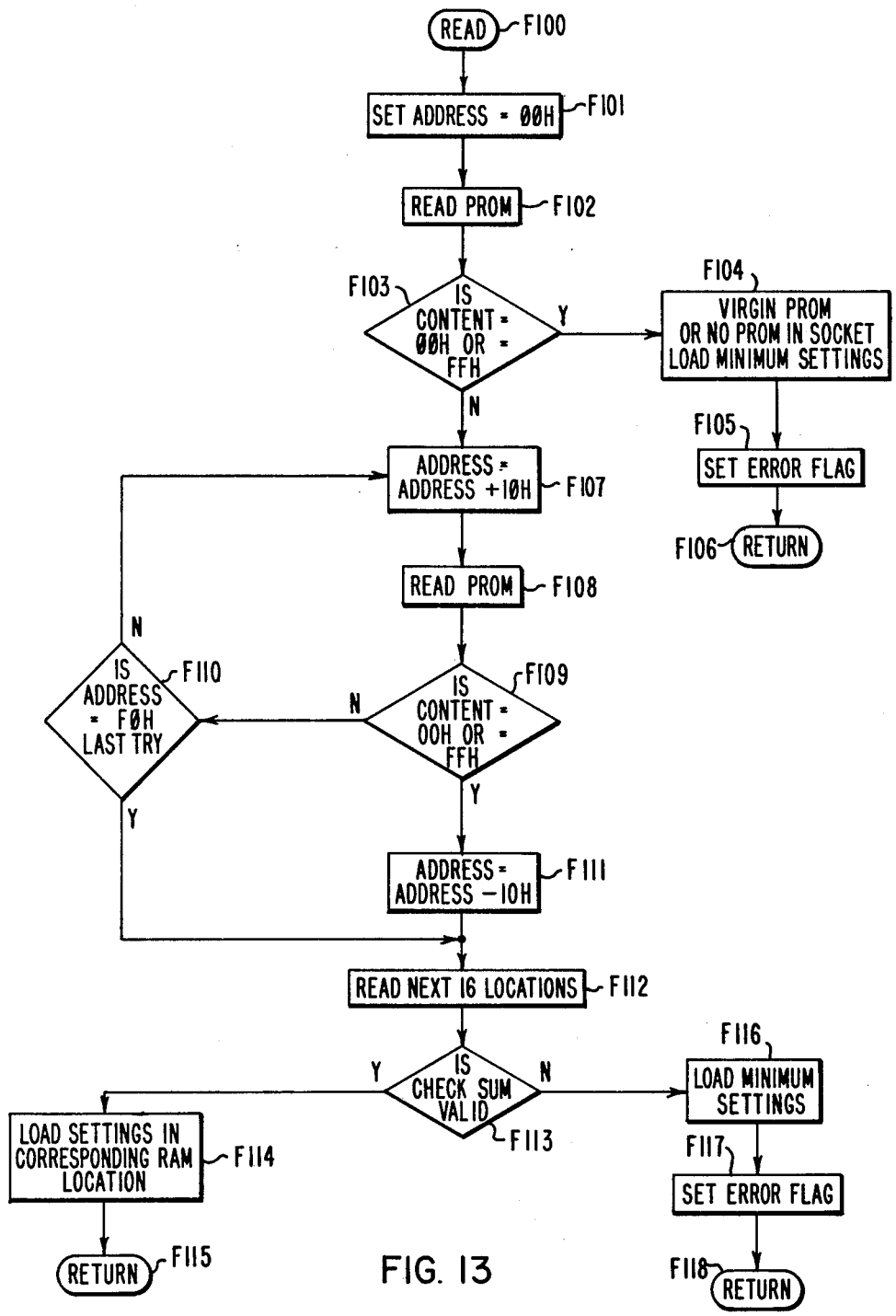
FIG. 13 is a flow chart of the routine to read external programmable read-only-memory of the program of FIG. 8.

As stated previously, the READ routine shown in FIG. 13 allows the user to reprogram the external PROM chip with new set point limit values up to 16 times via a PROM programmer. It also loads minimum settings for the breaker, if the PROM was not correctly programmed or the PROM is missing.

As an example, the settings may be encoded in PROM 82 as follows:

| (× 32) | LDPU | of .8 PU | = .8 × 32 | = 26 D | = 1A H |
|---|---|---|---|---|---|
| (× 8.5) | LDT | of 2 sec | = 2 × 8.5 | = 17 D | = 11 H |
| (× 16) | SDPU | of 1.5 PU | = 1.5 × 16 | = 24 D | = 18 H |
| (× 1) | SDT | of 20 cycles | = 20 × 1 | = 20 D | = 14 H |
| (× 64) | GFP | of .2 PU | = .2 × 64 | = 12.8 D | = 0D H |
| (× 1) | GFT | of 20 cycles | = 20 × 1 | = 20 D | = 14 H |
| (× 16) | ITC | of 8.0 PU | = 8 × 16 | = 128 D | = 80 H |

In this format the settings are ready to be used by the program. However, in order to be displayed (every 4 seconds) they must be each converted to recognizable decimal characters.

Thus, every display routine calls a routine to convert the integer and fraction portions of the display value from hex format to BCD. The BCD values are then converted to 7-segment format by the latch decoders.

What we claim is:

1. Circuit interrupter apparatus, comprising:

interrupter means for conducting current flow through an associated electrical circuit and for operating to interrupt current flow therethrough on command;

sensing and powering means disposed in appropriate relationship with said interrupter means for sensing current flow therethrough, for providing a signal which is related to said current flow, and for providing operating power for said apparatus;

storage means for storing a multi-function time-current tripping characteristic;

electronic means connected to the output of said sensing and powering means, to said storage means, and to said interrupter means for analyzing electrical parameters of an associated circuit and for operating said interrupter means when current flow therethrough exceeds said time-current trip characteristic, said storage means additionally comprising means for identifying each function of said multi-function trip characteristic with a numeric table;

numeric display means interconnected with said electronic means and visible from the exterior of said apparatus for displaying a substantially instantaneous real-time numerical representation of said parameters over a period of time;

memory means for storing a value corresponding to the value of interrupter means current flow at which operation of said interrupter means was initiated, said numeric display means being interconnected with said memory means for displaying said stored value; and means operable upon operation of said interrupter means for supplying to said display means the numeric label of the function of said multi-function time-current trip characteristic which was exceeded by current flow through said interrupter means to cause operation thereof; whereby said numeric display means displays cause-of-trip information.

2. The combination as claimed in claim 1 wherein said numerical label comprises a single-digit numerical value.

* * * * *